UNITED STATES PATENT OFFICE.

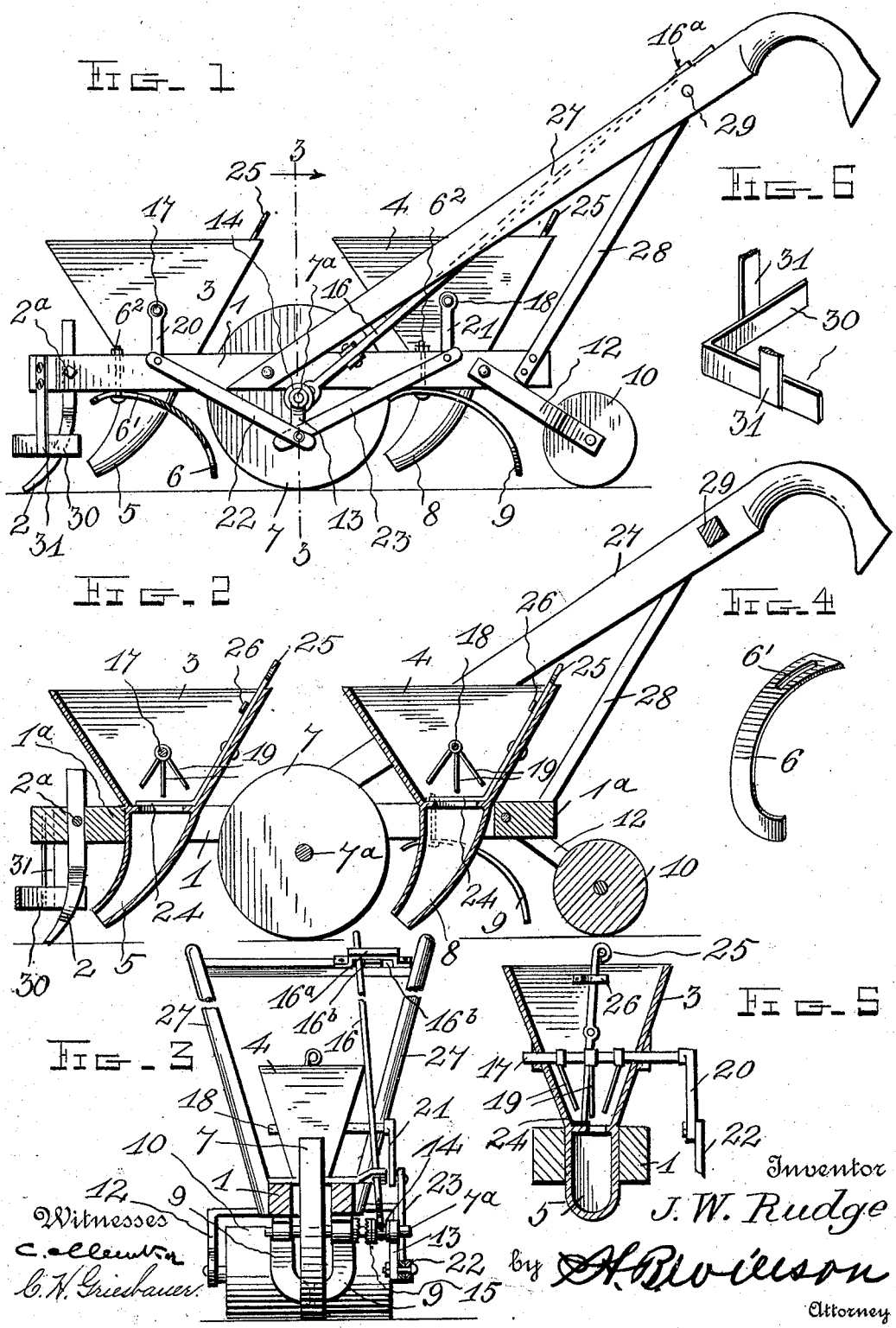

JOHN WILLIAM RUDGE, OF MONROE, NORTH CAROLINA.

COMBINED FERTILIZER-DISTRIBUTER AND COTTON-SEED PLANTER.

No. 806,005.　　　Specification of Letters Patent.　　　Patented Nov. 28, 1905.

Application filed August 7, 1905. Serial No. 273,159.

*To all whom it may concern:*

Be it known that I, JOHN WILLIAM RUDGE, a citizen of the United States, residing at Monroe, in the county of Union and State of North Carolina, have invented certain new and useful Improvements in a Combined Fertilizer-Distributer and Cotton-Seed Planter; and I do declare the following to be a full, clear, and exact description of the invention, such as will enable others skilled in the art to which it appertains to make and use the same.

This invention relates to combined fertilizer-distributers and cotton-seed planters.

The object of the invention is to provide a machine of this character which will open a furrow, distribute the fertilizer and cover the same, plant the seed, and then cover and roll them all at the same time, means being provided for regulating the discharge of the fertilizer and seed.

Another object is to provide agitators to assist in discharging the seed and fertilizer and prevent the same from becoming clogged in the hoppers, means being also provided for driving the agitators and for throwing the same into and out of gear.

A further object is to provide a device of this character which will be simple in construction, strong and durable, and well adapted to the purpose for which it is designed.

With these and other objects in view the invention consists of certain novel features of construction, combination, and arrangement of parts, as will be more fully described, and particularly pointed out in the appended claim.

In the accompanying drawings, Figure 1 is a side elevation of the device. Fig. 2 is a vertical longitudinal sectional view. Fig. 3 is a vertical cross-section on the line 3 3 of Fig. 1. Fig. 4 is a detail view of one of the covering-blades. Fig. 5 is a vertical cross-sectional view through one of the hoppers, and Fig. 6 is a detail perspective view of the V-shaped deflector-blades arranged on the front end of the cultivator-beam.

Referring more particularly to the drawings, 1 denotes the beam, consisting of two bars arranged parallel with each other and securely bolted together, but spaced apart by blocks $1^a$, arranged between the ends of the same.

2 denotes a plow or furrow-opener arranged at the front end of the beam, the shank or standard of which is adjustably mounted in the forward spacing-block $1^a$ by means of a set-screw $2^a$.

3 and 4 denote fertilizer and seed hoppers supported upon the beam 1, the fertilizer-hopper being arranged immediately in rear of the plow 2, and on the lower end of the hopper 3 is formed a discharge-spout 5, which projects downwardly and forwardly and is adapted to discharge fertilizer from the hopper into the furrow opened by the plow 2.

6 denotes a curved covering-blade bolted at its upper end to the under side of the beam 1 and arranged to cover the fertilizer discharged by the tube 5, said blade having formed in its upper end a slot $6'$, through which the securing-bolt $6^2$ is adapted to pass, thereby permitting the blade to be adjusted on said beam to cause the former to scrape more or less dirt onto the fertilizer deposited from the spout 5.

7 denotes a supporting and power wheel journaled in bearings on the beam 1 in rear of the hopper 3, the wheel 7 also serving as a roller to lightly pack the fertilizer and soil into the furrow.

8 denotes the discharge-spout of the seed-hopper 4, arranged immediately in rear of the wheel 7, and 9 denotes seed-covering blades bolted at their upper ends to the under side of the beam 1 and adapted to cover the seed discharged by the tube 8. The blades 9 are constructed similarly to the blades 6 and are adjustably connected to the beam 1 in the same manner.

10 denotes a smoothing and packing roller connected to the rear end of the beam 1 by means of the pivoted frame 12.

13 denotes a crank-arm provided on its upper end with a sleeve 14, which is loosely mounted on the end of the power-wheel shaft $7^a$. On the inner end of the sleeve is formed one member of a clutch 15, the opposite member of which is fixed to the shaft $7^a$. A clutch-shifting rod 16 is pivotally connected to the beam 1 and has its lower end forked to engage an annular groove in the loose member of the clutch and having its upper end formed into a handle and arranged within convenient reach of the operator. The upper end of the rod 16 rests on the cross-bar of the plow-handles and is adapted to pass through a spring-guide loop $16^a$ and to engage stop-shoulders $16^b$, which hold the same in position when the clutch is thrown either into or out of gear.

17 and 18 denote agitator-shafts mounted in the hoppers 3 and 4, and on said shafts are arranged fingers 19, preferably five in number, three of which are arranged centrally and in line above the feed-opening of the hoppers, and the other two are arranged one on each side of the central fingers and projecting obliquely toward the feed-opening, as shown in Fig. 5. This arrangement of the agitator-fingers prevents clogging of the seed or fertilizer in the bottom of the hoppers and causes the same to be properly fed or discharged.

On the outer ends of the shafts 17 and 18 are formed cranks 20 and 21, which are connected by pitmen 22 and 23 to the central crank-arm 13 on the power-shaft, so that when said crank-arm is thrown into gear with the power-wheel shaft an oscillatory movement will be given to the agitator shafts and fingers when the machine is drawn along, as will be understood.

Any suitable means may be provided for regulating the size of the feed-opening in the hoppers 3 and 4, such means being here shown as consisting of a plate 24, connected to the lower end of an operating-rod 25, which is pivoted to the side of the hopper. The plate 24 is adapted to rest on the bottom of the hoppers and to be moved laterally across the same to regulate the size of the discharge-opening formed therein. The upper end of the operating-rod 25 is adapted to project above the hopper to form a handle and is also adapted to engage a spring-clip 26, whereby the rod and plate are held in the desired position.

27 denotes handles, which may be of any suitable construction and are connected at their lower ends to the beam 1 and supported near their upper ends by brace-bars 28, which are fixed at their lower ends to the rear end of the beam 1. A cross-bar 29 connects the upper ends of the handle-bars and spaces the same apart.

The pivotal connection of the roller 10 with the frame permits the same to readily swing up or down in passing over rough places, the weight of the roller being sufficient to smooth the soil and lightly pack the same over the seed.

The clutch connection between the crank on the power-shaft permits the agitator-shafts to be quickly thrown into or out of gear. If desired, the front end of the cultivator-beam may be provided with deflector-blades 30, said blades being arranged in V shape and provided with upwardly-projecting standards 31, by which the blades are detachably connected to the ends of the beam by means of bolts, as shown. The deflector-blades 30 are designed to remove or throw to each side all clods, stones, rubbish, and weeds that may lie in the line of the furrow or row. When desired, the blades 30 may be quickly removed.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

The herein-described combined fertilizer-distributer and cotton-seed planter, comprising the beam, the supporting and power roller having its bearings at the center of the beam and having its shaft provided with the loose crank, the furrow-opener at the front end of the beam, the trailing roller at the rear end of the beam, the hoppers near the front and rear ends of the beam and each having an oscillating agitator provided at one end with a crank, pitmen connecting the power-roller crank to the agitator-cranks, the movable clutch element on the power-roller shaft, and the lever to shift such movable clutch element into and out of engagement with the loose crank.

In testimony whereof I have hereunto set my hand in presence of two subscribing witnesses.

JOHN WILLIAM RUDGE.

Witnesses:
J. D. ROST,
W. J. RUDGE.